UNITED STATES PATENT OFFICE.

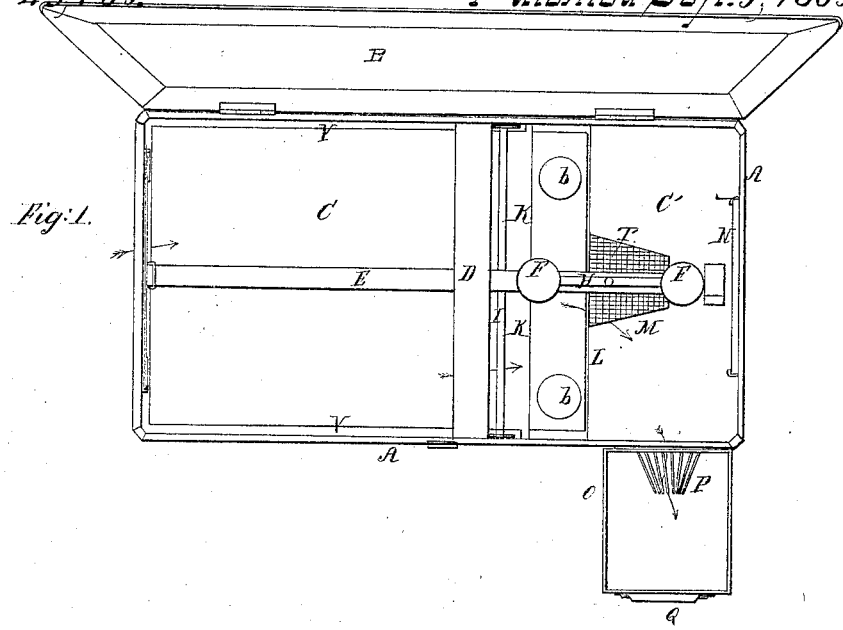
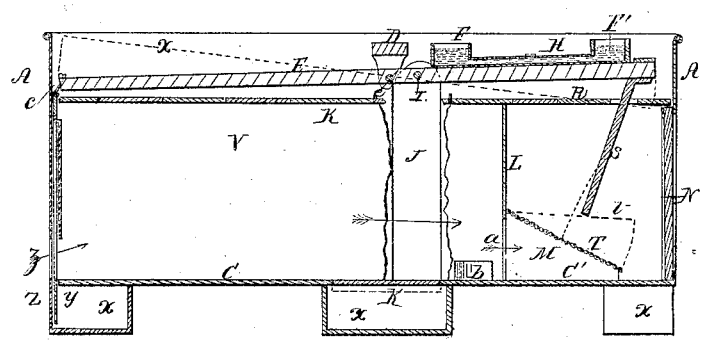
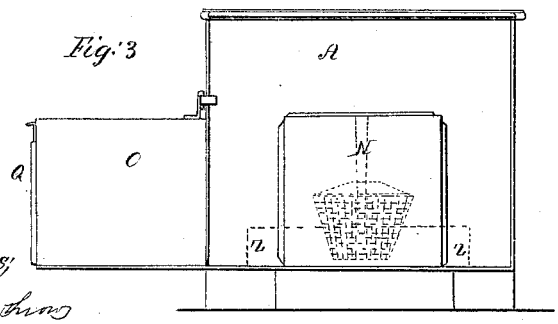

ALFRED EDWARDS, OF CHICAGO, ILLINOIS.

IMPROVEMENT IN ANIMAL-TRAPS.

Specification forming part of Letters Patent No. 49,735, dated September 5, 1865.

*To all whom it may concern:*

Be it known that I, ALFRED EDWARDS, of Chicago, in the county of Cook and State of Illinois, have invented a new and useful Improvement in Automatic Rat-Traps; and I do hereby declare that the following is a full, clear, and exact description thereof, reference being had to the accompanying drawings and the letters and figures marked thereon, which form part of this specification.

In said drawings, Figure 1 represents a plan or top view of my invention, the covers being removed so as to disclose the interior parts. Fig. 2 is a longitudinal vertical section of the same through the center thereof, and Fig. 3 is an end view of the same.

The same letters in the different figures denote corresponding parts of my invention.

The nature of my invention is so constructing a rat-trap that the weight of the rat within the trap effectually closes the aperture through which he enters the trap and prevents his escape, and when the rat passes into another compartment in the trap, which is also closed behind him, the aperture or entrance to the trap opens automatically, and the trap is ready for another victim.

To enable those skilled in the art to understand, make, and use my invention, I will proceed to describe the same with particularity, reference being made to the aforesaid drawings.

A represents the walls or inclosure of the trap, which is constructed in the form of an oblong box or trunk, and is provided with the cover B, attached thereto by hinges. This box may be made of wood or metal, and is divided into two copartments, C and C', by the partition L, and is of suitable size to adapt it to the size of the animal to be entrapped.

In the floor of the chamber C there is a movable platform, marked K, extending across the bottom of the trap, and attached at each end to the upright bars J, which are suspended from the rod I, passing through or attached to the lever E, as shown. The said lever E is supported upon a fulcrum at e by the cross-bar D. Thus the platform K is suspended upon the lever E, and has no other support. The distance between the rod I and the fulcrum e is so adjusted with reference to the lengths of the two arms of the lever E that the weight of the platform K of itself is not enough to bring the short arm of the lever down, but has a chamber underneath, so as to allow it to be depressed whenever any slight pressure or weight is superimposed.

F F' are small cups or receptacles arranged at suitable points upon the lever E, as shown, and connected by a hollow tube marked H. These cups contain mercury or some other suitable fluid that will readily flow from one to the other through the tube H, according as the lever may be inclined.

Z represents the aperture or entrance into the trap, and a represents the opening through which the rat enters into the second copartment, C'.

At that end of the lever E near the entrance there is attached by some suitable connection the vertical slide y, which lies below the aperture Z when the end of the lever to which it is attached inclines downward, but which rises up and closes the said opening when the lever inclines in the opposite direction, as indicated by the dotted lines in Fig. 2.

The opening a in the partition L opens directly into the box M, which is constructed of wires interwoven with large meshes, and is provided with a sloping top, T, hinged to L, opening upward by pressure from beneath, as shown by the dotted line U.

S represents an arm, attached to the end of the lever E and projecting downward so that its end lies just above the lid T of the wire box M.

N represents a pane of glass, which covers a large opening in the end of the trap and freely admits the light.

b b represent cups containing cheese or other kinds of food which will tempt the rat to enter the trap.

O is a box, which is attached to one side of the chamber C', which opens into said box, which opening is surrounded by wires, arranged as shown. This box O is provided with a slide or sliding door, (marked Q in the drawings.)

The trap is placed upon the supports X, the spaces between which are designed to be of the same shape and appearance as the opening Z into the trap, so that the rat's suspicions of strategy will not be aroused by any unusual or different appearance of the entrance into the trap.

R represents a false cover to the trap, which is arranged below the lever E, so as to conceal it and the other parts of the operating device from the rat, who is deliberating at the door upon the propriety of "going in," and also while he is in the trap, which might frighten him away. The sides of the trap are also provided with inside linings, so as to conceal the movable uprights from view.

Having thus described my improvement in automatic rat-traps, I will now describe its operation.

The lever being arranged as shown in Fig. 2, the rat enters the trap and advances toward the cups $b$, containing the cheese, in reaching which he steps upon the said movable platform K, and by his weight vibrates the lever and brings down the end over the chamber C', throwing up the opposite end and bringing the slide $y$ up, so as to close the opening Z and effectually bar his exit in that direction. At the same time the fluid contained in the cups F F' flows from F to F', and this, by its accumulated weight near the end of the lever, keeps it in that position, (even though the rat might remove from the platform,) effectually closing the aperture Z. The rat, finding himself unable to get out in that direction, seeks an outlet at $a$, being induced thereto by the light coming in that direction through the glass N. Pushing his way through said opening $a$, he raises the lid T and escapes into the chamber C', the raising of the lid at the same time throwing up the end of the lever and opening the entrance Z into the trap. The fluid in the cups, again flowing back into F, keeps the lever in that position and the entrance open until another victim walks the fatal platform. The rat, still seeking to escape, then passes through into the chamber O, the wires P surrounding the opening into which closing together as he passes, so as to prevent his passing through in the opposite direction. In the morning the slide Q is removed, and the rats which have accumulated in the box O through the night are taken out and properly disposed of.

Having now described the construction and operation of my improvement in automatic rat-traps, I will specify what I claim as new therein and desire to secure by Letters Patent:

1. The combination of the lever E, sliding door $y$, uprights J, and movable platform K, arranged and operating substantially as and for the purposes herein set forth and shown.

2. The combination of the cups F F and tube H, containing fluid, as described, with the lever E and slide $y$, arranged and operating as and for the purposes specified.

ALFRED EDWARDS.

Witnesses:
W. E. MARRS,
F. H. BROWN.